Patented Sept. 11, 1945

2,384,700

UNITED STATES PATENT OFFICE 2,384,700

ALKYLATED PHENYL-ISOPROPYL-AMINES AND PROCESS FOR THE MANUFACTURE OF SAME

Otto Schnider, Basel, Switzerland, assignor to Hoffmann-La Roche Inc., Nutley, N. J., a corporation of New Jersey No Drawing. Application September 3, 1943, Serial No. 501,174. In Switzerland November 13, 1942

8 Claims. (Cl. 260—570.8)

Various compounds of the group of phenyl-isopropyl-amines are known which are capable of acting as central stimulants. Investigations having regard to the relations between principal, side and toxic actions have revealed that improvements are desirable.

It has now been found that valuable alkylated phenyl-isopropylamines can be obtained by reacting (3,4-dimethyl-phenyl)-acetone with ammonia or methylamine in the presence of catalytically agitated hydrogen. Surprisingly enough an improvement in the properties only occurs in the case of those compounds which, apart from the methyl group in position 4, carry a further methyl group in position 3. If the second methyl group stands in position 2, compounds without therapeutic value are obtained.

The two products obtained in accordance with the present process are colorless oils having a basic odor. $\alpha$-(3,4-dimethyl-phenyl)-$\beta$-amino-propan boils between 116–118° C. under 12 mm. Hg. The corresponding $\beta$-methylamino compound boils at 121–123° C. under 12 mm. Hg. The bases are little soluble in water. With acids they form neutral salts which are readily soluble in water. With hydrobromic acid, for instance, $\alpha$-(3,4-dimethyl-phenyl)-$\beta$-amino-propan-hydrobromide having a melting point of 132–133° C. and $\alpha$-(3,4-dimethyl-phenyl)-$\beta$-methylamino-propan-hydrobromide having a melting point of 142–143° C. are obtained.

The compounds are to be employed as medicinal preparations.

Example 200 parts by weight of a 30 per cent. solution of ammonia in methyl alcohol are added to 162 parts by weight of (3,4-dimethyl-phenyl)-acetone while cooling. 6 parts by weight of a nickel catalyst are immediately added and the product is hydrogenised in a hydrogen atmosphere under a gauge pressure of about 15 atmospheres at a temperature of between 70 and 90° C. The calculated quantity of hydrogen is taken up in a short time. After cooling, the product is separated from the catalyst by suction filtration, the solvent distilled off and the residue fractionated in vacuo. The colorless $\alpha$-(3,4-dimethyl-phenyl)-$\beta$-amino-propan boils at 116–118° C. under a pressure of 12 mm. It is of basic character and can be converted into neutral salts by means of acids. The hydrobromide melts at 132–133° C.

If a methyl alcoholic methylamine solution is used instead of ammonia solution, $\alpha$-(3,4-dimethyl-phenyl)-$\beta$-methylamino-propan is obtained under the same conditions as a colorless liquid having a basic odor and boiling at 121–123° C. under 12 mm. Hg. The hydrobromide melts at 142–143° C.

I claim:

1. A substance selected from the group consisting of compounds of the formula

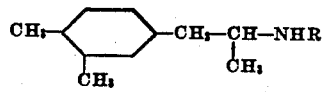

wherein R stands for a radical selected from the group consisting of hydrogen and methyl, and the salts thereof.

2. $\alpha$-(3,4-dimethyl-phenyl)-$\beta$-amino-propan-hydrobromide.

3. $\alpha$-(3,4-dimethyl-phenyl)-$\beta$-methylamino-propan-hydrobromide.

4. Process for the manufacture of a compound of the formula

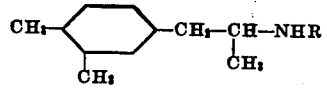

wherein R is selected from the group consisting of hydrogen and methyl, comprising catalytically halogenating (3,4-dimethyl-phenyl)-acetone with a substance selected from the group consisting of ammonia and methylamine.

5. Process for the manufacture of $\alpha$-(3,4-dimethyl-phenyl)-$\beta$-amino-propan, comprising catalytically hydrogenating (3,4-dimethyl-phenyl)-acetone with ammonia.

6. Process for the manufacture of $\alpha$-(3,4-dimethyl-phenyl)-$\beta$-methylamino-propan, comprising catalytically hydrogenating (3,4-dimethyl-phenyl)-acetone with methylamine.

7. Process for the manufacture of $\alpha$-(3,4-dimethyl-phenyl)-$\beta$-amino-propan-hydrobromide, comprising catalytically hydrogenating (3,4-dimethyl-phenyl)-acetone with ammonia and treating the reaction product with hydrobromic acid.

8. Process for the manufacture of $\alpha$-(3,4-dimethyl-phenyl)-$\beta$-methylamino-propan-hydrobromide, comprising catalytically hydrogenating (3,4-dimethyl-phenyl)-acetone with methylamine and treating the reaction product with hydrobromic acid.

OTTO SCHNIDER.

Certificate of Correction

Patent No. 2,384,700.

September 11, 1945.

OTTO SCHNIDER

It is hereby certified that error appears in the printed specification of the above numbered patent requiring correction as follows: Second column, line 30, claim 4, for "halogenating" read *hydrogenating*; and that the said Letters Patent should be read with this correction therein that the same may conform to the record of the case in the Patent Office.

Signed and sealed this 21st day of January, A. D. 1947.

[SEAL]

LESLIE FRAZER,
*First Assistant Commissioner of Patents.*